United States Patent [19]

Blaschke et al.

[11] 4,028,600

[45] June 7, 1977

[54] METHOD AND APPARATUS FOR SLOW SPEED OPERATION OF AN INVERTER CONTROLLED ROTATING FIELD MACHINE

[75] Inventors: Felix Blaschke, Erlangen; Herwig Klautschek, Furth, both of Germany

[73] Assignee: Siemens Aktiengesellschaft, Munich, Germany

[22] Filed: May 15, 1975

[21] Appl. No.: 577,918

Related U.S. Application Data

[63] Continuation-in-part of Ser. No. 381,541, Aug. 23, 1973, abandoned.

[30] Foreign Application Priority Data

Apr. 3, 1975 Germany ............................ 2514557

[52] U.S. Cl. .............................. 318/227; 318/231; 318/696
[51] Int. Cl.² .................... H02K 17/02; H02P 8/00
[58] Field of Search .......... 318/138, 227, 230, 231, 318/696; 321/2

[56] References Cited

UNITED STATES PATENTS

| | | | |
|---|---|---|---|
| 3,445,741 | 5/1969 | Gerber | 318/696 |
| 3,593,083 | 7/1971 | Blaschke | 318/231 |
| 3,719,878 | 3/1973 | Ferguson et al. | 318/696 X |
| 3,736,487 | 5/1973 | Cook et al. | 318/696 |
| 3,742,329 | 6/1973 | Giguere | 318/696 |
| 3,748,566 | 7/1973 | Brembs | 318/696 X |
| 3,829,754 | 8/1974 | Rettig | 321/2 |

*Primary Examiner*—Robert J. Hickey
*Attorney, Agent, or Firm*—Kenyon & Kenyon Reilly Carr & Chapin

[57] ABSTRACT

A method and apparatus for operating a rotating field machine, which is controlled by an inverter of the type which provides only a predetermined limited number of discrete positions of the stator current vector, in such a manner so that when it is desired to position the machine between two of the discrete vector positions, the discrete positions on each side of the desired vector position are alternatively energized resulting in an average position which is the desired vector position. For operation in a system where the vector can only rotate in one direction apparatus is disclosed which permits the alternate energization to occur by moving the vector at the maximum possible speed over the portion of rotation which is outside an area surrounding the desired position and moving it more slowly while inside this area.

16 Claims, 17 Drawing Figures

METHOD AND APPARATUS FOR SLOW SPEED OPERATION OF AN INVERTER CONTROLLED ROTATING FIELD MACHINE

RELATED APPLICATIONS

This application is a continuation-in-part of application Ser. No. 381,541 filed Aug. 23, 1973, now abandoned.

BACKGROUND OF THE INVENTION

This invention relates to inverter controlled rotating field machines in general and more particularly to an improved method and apparatus for operating such machines at slow speed.

The use of a converter controlled rotating field machine is well known in the prior art. Typcially in such systems the AC voltage from the 3 phase line is rectified and provided through a DC link to a controlled inverter from which current is supplied to the rotating field AC machine. Typically the magnitude of the current is controlled in the DC link. Typical of such systems is that shown in U.S. application Ser. No. 63,073, a continuation of U.S. Ser. No. 237,572 based on German Offenlegunsshrift 1,941,312. A problem exists in such systems however in that only a discrete number of stator vector positions are possible. That is, depending on the number of control elements in the inverter and the number of windings in the machine, energization corresponding only to predetermined discrete positions of the stator current vector is possible i.e. for energization each pair of control devices in the converter, a specific vector results. In operation the vector is continuously stepped through 360° to obtain rotation of the machine. At high speeds such stepping does not cause problems and the machine rotates smoothly. However, at low speeds, the discrete positions can cause undesirable harmonics in the torque.

Inverters do exist which can be commutated in both directions. Such an inverter with a center tap circuit and sequential phase quenching is disclosed in U.S. Pat. No. 3,733,543. However, the sequential phase quenching circuit disclosed therein has a major disadvantage in that the windings of the asynchronous machine are loaded with a d-c component and thus must be made accordingly larger.

SUMMARY OF THE INVENTION

The present invention provides a method for operating such rotating field machines at slow speeds and discloses an apparatus for carrying out that method. Essentially what the method of the present invention does is to alternately position the stator vector at the two discrete positions which are on each side of the desired vector position. By controlling the time of energization of the vector positions on each side of the desired position, an average may be obtained which corresponds to the desired position.

Typically, the inverter control devices can only be commutated in one direction. This means that in alternatingly energizing the two discrete vector positions on each side of the desired position it is necessary to rotate completely around. Switching of the control elements is controlled by a control vector which in normal systems is caused to follow what is termed a setting vector. The setting vector represents the desired position of the motor. The control vector is made to follow this setting vector and its sine and cosine signals used to selectively and sequentially energize the individual control elements in the converter. In the present invention, the control vector is caused to move slowly from a position approximately 30° on one side of the desired position or position of the setting vector to 30° on the other side of the setting vector. Once it moves 30° past the setting vector it is then caused to move at the maximum commutation speed possible back to the position where it is 30° before the setting vector. As long as the setting vector is moving slowly i.e. the dwell time of the vector is long as compared to the maximum speed of commutation, the overall effect is that of switching between the two discrete positions on opposite sides of the setting vector, with the time at each one effectively controlled to result in an average position closely approximating that of the setting vector.

Since, as noted above, inverters which can be commutated in both directions are available, there is also a need for a simple apparatus for carrying out the method of the present invention therein.

The present invention also provides a solution to this problem. To accomplish the switching between two vector positions in such a device, a first sawtooth generator which is synchronized with the frequency of the desired stator controlled vector frequency has its output signal compared with the output signal of a second sawtooth generator operating at a higher frequency. The result of this comparison or summation is provided to a comparator or limit detector the output signal of which is used to activate a switching device placed between the converter control unit and the rectifier control path and is used to change the stator current vector position between two possible discrete positions.

Since, with increasing stator current frequency, the harmonics of the torque become less important, it becomes possible to shift from a pulsed operation to an operation which is not pulsed. In accordance with the present invention, to avoid a jump of the phase in the stator current when making the transition from pulse to non-pulsed operation, a control unit is provided which furnishes a first group of control voltages and a second group of control voltages for the individual rectifiers.

In this arrangement the control voltage of the first group assigned to a respective rectifier leads the corresponding control voltage of the second group by $180/n$ electrical degrees where $n$ is the number of inverter rectifiers. In this arrangement the control voltages are capable of being activated by groups using an additional comparator which has as its input a speed proportional input signal and which actuates a double throw switch to switch between the two groups of control voltages.

Furthermore, the present invention discloses a novel inverter in the form of a three phase bridge consisting of six thyristors. In the described arrangement it has been found particularly advantageous to connect a diode in series with each thyristor. Furthermore, the thyristor anodes of one bridge half and the thryistor chathodes of other bridge half are always connected to each other through a capacitor. The disclosed inverter is also suited for any application where the requirement for an operational phase sequence change of the three phase loads supplied by the inverter exists.

DETAILED DESCRIPTION OF THE PREFERRED EMBODIMENT

Figure 1:
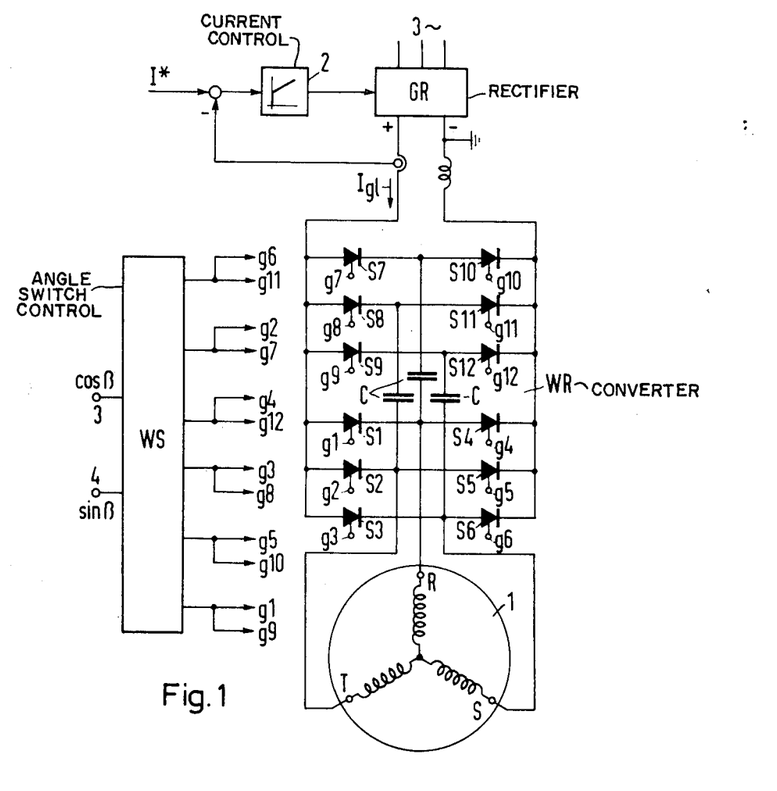
FIG. 1 is a schematic diagram of a converter driven rotating field machine typical of those found in the prior art.

FIG. 1 illustrates a typical converter controlled asynchronous machine; as shown, the three phase machine 1 having respective stator windings R, S and T has its voltage supplied by a converter WR. Power is provided to the converter WR by a DC link which is supplied from a rectifier GR which has the three phase line as its input. Rectifier GR is controlled by a current control 2 which operates in well known fashion to result in a current $I_{gl}$ flowing in the DC link which is equal to a preset value current I*. Converter WR is controlled by a conventional angle switch control device which has at its respective inputs 3 and 4 the quantities cos B and sin B representing the sine and cosine of B which is the angle of the control vector. The converter WR itself includes the main control devices which may, for example, be thyristors, S1 through S6. Connected in parallel with the main control elements are respective commutation capacitors designated C and commutation control elements S7 through S12.

These control elements, which likewise may be thristors, are used to turn off or extinguish the main control elements S1 through S6. The commutation voltages required for this purpose are provided by the commutation capacitors which form resonant circuits with the stator phase windings of the asynchronous machine 1.

Figure 2:
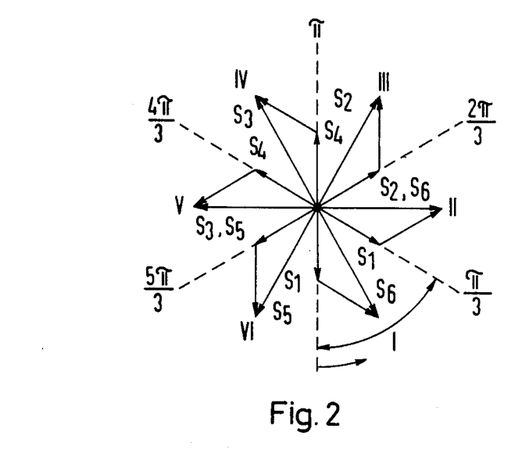
FIG. 2 is a vector diagram illustrating the discrete vector positions obtainable with the system of FIG. 1.

In operation one of the control elements S1 through S3 along with one of the control elements S4 through S6 is always conducting in response to positive firing pulses applied to the respective control electrodes G1 through G6 by corresponding outputs from the angle switch control WS. Thus, the current $I_{gl}$ in the DC link will at all times be flowing through two of the phase windings R, S and T. Operation may be more clearly understood by reference to FIG. 2. in response to the inputs at terminals 3 and 4 the angle controller WS sequentially causes the various control elements to fire. As the control vector rotates and the values of sin B and cos B change, the sequence illustrated by FIG. 2 will occur. For example, as indicated by the vector I, first S1 and S6 will fire. This will result in current flowing through the windings R & S resulting in the vector I. Next S2 and S6 will be fired resulting in the vector II. The elements S2 and S4 will then be fired resulting in the vector indicated as III. In a similar manner other of the control elements will fire to result, in sequence, in the vectors IV, V and VI, whereupon vector I will again occur. In well known fashion, as the stator vector rotates through the six positions, the rotor will follow this vector. This will occur in steps since only the six discrete positions shown are possible. At high speeds this is no problem and will result in relatively smooth operation. However at low speeds undesirable harmonics in the torque result causing chattering of the motor.

Figure 3:
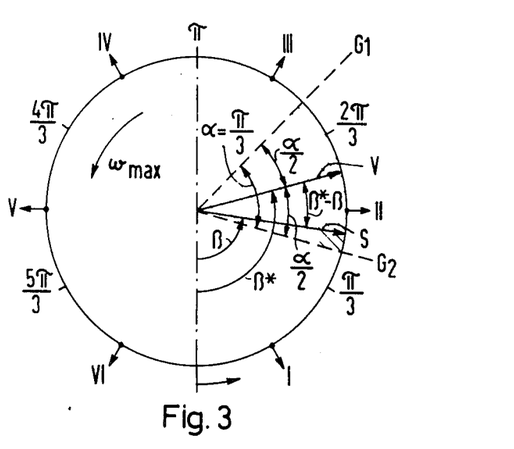
FIG. 3 is a vector diagram helpful in understanding operation of the present invention.

FIG. 3, graphically demonstrates the method of the present invention. There is shown on FIG. 3 a vector V which is the setting vector i.e. the desired position of the stator vector. The vector V is shown as making an angle B with a reference. Displaced from the vector V is the control vector S making an angle B* with the reference. The angular difference between the vector V and vector S is B* minus B. A sector bounded by the lines $G_1$ and $G_2$ is shown. This sector is symmetrical about the vector V and subtends an angle of $\alpha$. Thus on each side of vector V there is a sector subtending $\alpha/2$. For reasons to be explained below in the type of machine illustrated on FIG. 1 $\alpha$ is preferably equal to $\pi/3$.

As noted above, the position illustrated by the vector V is the desired stator position. However, since only the six discrete positions are possible, only energization of the control elements to place the vector at either the vector position indicated as II or that indicated III is possible. However, if the vector can be caused to alternate between the positions indicated by II and III at a relatively high rate of speed, with the vector spending more time at the position II than at III, an average closely approximating the vector positions of vector V may be obtained. To accomplish this, the method of the present invention causes the vector S to continually rotate. When within the shaded sector the vector S is caused to rotate at a slow rate of speed. However when outside of the shaded sector between $G_1$ and $G_2$ the vector is caused to rotate at the maximum speed possible while still maintaining commutation in the machine. Since, the invention is used only for low speed operation (which may also include a condition where the motor is stopped), the vector V may be considered for all practical purposes static and its dwell time will be much longer than the time required for the vector S to rotate from $G_1$ back to $G_2$ at its maximum speed. The result will be that the vector position II will be maintained for a longer time than that of vector position III. The vector will remain at the rest of the positions for extremely short periods of time with respect to the time that the vector is at positions II and III. Thus, in effect the vector position will be switching between the positions II and III resulting in an average position which closely approximates the position of vector V. The selection of $\alpha$ equal to $\pi/3$ is made because optimum results are obtained if the sector chosen is of angular size equal to the angle between two discrete positions. In the present case there are six discrete positions of 60° and thus $\alpha$ is chosen as $\pi/3$. The direction of the vector S indicated by the arrows on FIG. 3 can be opposite to that of the direction of motion of the vector V. Vector S will always rotate in the same direction. However, in a positioning motor or the like, the vector V may overshoot and come back. The system will operate equally well under these conditions.

Figure 4:
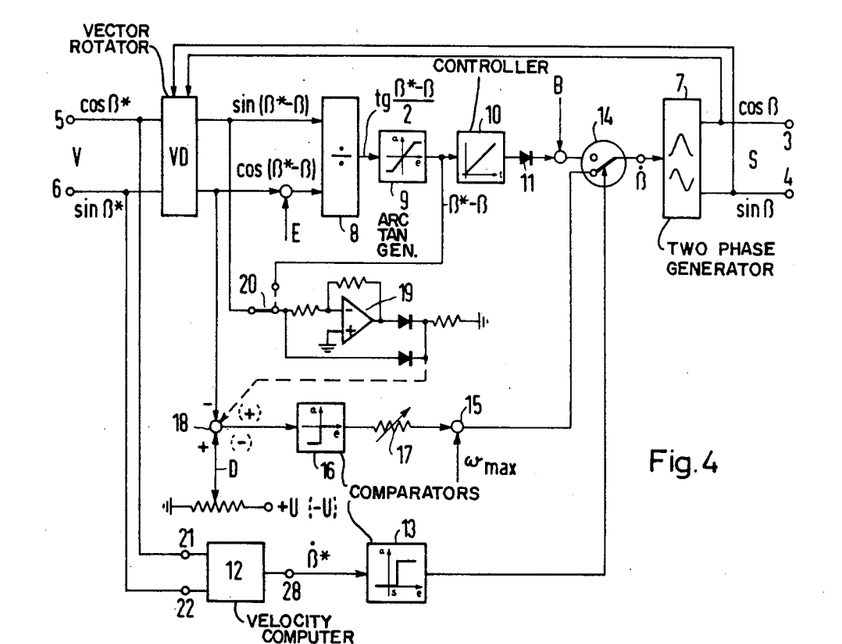
FIG. 4 is a block schematic diagram of a preferred embodiment of the present invention.

The preferred embodiment of the control system for practicing the method of the present invention is illustrated by FIG. 4. This system comprises essentially; normal control means used during high speed operation; means to sense when the speed of rotation or frequency drops below a predetermined amount; and means to control the system according to the present invention when such low speed operation occurs. During normal high speed operation the switch 14 is in the position not shown, coupling a summing junction to a static two phase generator 7. With this connection operation occurs in a manner well known in the prior art. The values cos B* and sin B* along with the values cos B and sin B are provided as inputs to a vector rotator VD which provides as outputs sin (B*—B) and cos (B*—B) i.e. the sine and cosine of the angle between the setting vector and the control vector. Cos (B*—B) has added to it a fixed voltage E having a normalized value of one. Cos (B*—B) is provided as the divisor to a divider 8. Sin (B*—B) is provided to divider 8 as the dividend. The output of divider 8 will thus be a value equal to tan (B*—B)/2 in accordance with the well known formula that sine A divided by 1 plus cosine A equals tan A/2. Thus the output of divider 8 will be the tangent of the angular difference between the setting vector and the control vector divided by 2. This value is then provided as an input to an arctangent function generator 9 having a characteristic such that $E_{out}$ equals 2 arctan $E_{in}$. Thus the output of the arctangent generator 9 will be a quantity proportional to the difference between B* and B. This quantity is provided as an input to a controller 10 whose output is provided through diode 11, a summing junction where the quantity B is added and then through the switch 14 to the two phase generator 7. The desired condition is that the vector V and the vector S are coincident, i.e. B* equal to B. This will result in a zero input at the controller 10 which controller may in conventional fashion comprise an integrator. Thus an error signal will be integrated causing the output of the two phase generator 7 to change until a zero input is present at the controller 10 at which point the vector V and the vector S would be synchronized. Any deviation will result in an error which will be fed into the controller 10 causing it to integrate up or down to bring the two vectors back in agreement with each other. The diode 11 is provided to assure that only positive voltages are provided to the phase generator 10. The quantity B is added to the output of controller 10 to maintain a minimum output voltage to the two phase generator 7 in case the voltage from controller 10 drops below 0. Because only positive voltages are provided into the generator 7, only one direction of rotation of the vector S is possible. The generator 7 will typically comprise two series connected integrators each of which is preceeded by a multiplier, with the output of the second integrator being fed back to the input of the first integrator. When a voltage is provided at the input to such a device a sine cosine pair results at its output. The argument which is always the time integral of the input voltage. A device of this nature is shown in U.S. appliction Ser. No. 286,924 filed Sept. 7, 1972 and assigned to the same assignee as the present invention.

As noted above, this normal control system works quite well as long as a relatively high speed is maintained. However when speed is reduced harmonics result which cause uneven operation of the motor and chattering. To detect when speed falls below a predetermined value, the values cos B* and sin B* are provided to the input terminals 21 and 22 of a velocity computer 12 which will provide at its output a quantity porportional to the angular velocity B* of the setting vector. This output is provided as an input to a comparator 13 which is preset to the value below which smooth operation is no longer possible. Thus as the velocity of the setting vector drops below this predetermined amount an output is provided from the comparator 13. This output is a control input to the switch 14 causing it to be switched to the position shown. Switch 14 may be a semiconductor switch or a relay connected in conventional fashion to the output of comparator 13.

As noted above in connection with the discussion of FIG. 3, operation according to the method of the present invention requires a slow speed of rotation of the vector S when in the sector about the vector V and the maximum possible speed of rotation when outside that sector. In one illustrated embodiment, the output cos (B*—B) is provided as one input to a summing junction 18. The second input to summing junction 18 is a reference voltage which may be obtained from a potentiometer 30 which is provided over line D to summing junction 18. The voltage from potentiometer 30, which will be a positive voltage to offset the negative voltage output from the vector rotator VD, will be adjusted to correspond to a value equal to cos $\pi/5$. As a result, the output of the summing junction will be positive as long as the difference between B* and B (the angle between the vector V and the vector S) is greater than 30° and negative when this angle is less than 30°. Thus, a positive output from the summing junction indicates that the vector S is outside of the shaded sector of FIG. 3 and a negative voltage that it is inside the shaded sector of FIG. 3. This output of summing junction 18 is provided to a comparator 16 which responds to a positive input to provide a zero output and responds to a negative input to provide a negative output. The output of the comparator 16 is provided through a variable resistor 17 to a summing junction 15 which has as a second input a positive voltage corresponding to $\omega_{max}$ the maximum rotational speed possible while maintaining commutation. Thus when the comparator is providing a zero output corresponding to the vector S being outside the sector of FIG. 3 the full voltage of $\omega_{max}$ will be provided through switch 14 to the two phase generator 7 resulting in an output therefrom which will cause the rotation of the vector S at the maximum possible speed. As soon as the sector of FIG. 3 is re-entered, the output of comparator 16 will become negative offsetting the positive voltage. Potentiometer 17 is adjusted so that a small amount of positive voltage remains to cause the vector S to slowly rotate through the sector of FIG. 3. Thus, the amount of time the discrete vector positions on each side of the desired position of setting vector V are energized is controlled to result in an average position corresponding to the position of vector V.

In an alternate embodiment, the output of vector rotator VD designated sin (B*−B) is provided through a switch 20 to an absolute value circuit 19. The output of absolute value circuit 19 is then provided to the summing junction 18 as a positive voltage (as indicated in brackets). Thus to overcome this positive voltage a negative voltage from potentiometer 30 (also as indicated in brackets), is required. This voltage now will be set to correspond to the sine of 30° (Note that the absolute value circuit is needed when using the sine voltage since the sine changes sign on opposite sides of the vector V whereas the cosine does not).

Alternatively the output of the arctan 9 circuit which provides an output proportional to the angular difference between the control vector S and the setting vector V may be provided through the switch 20, in the position shown by the dotted line, to the absolute value circuit 19 (here again since the difference may be in either direction the absolute value circuit is needed). In this case, the voltage at potentiometer 30 will be set to correspond to the angle of 30° rather than its sine or cosine. The remainder of the operation in these two alternate embodiments is essentially as described above with the comparator operating to apply the full positive voltage representing $\omega_{max}$ when outside the sector, and a small positive voltage when inside the sector of FIG. 3.

Figure 5:
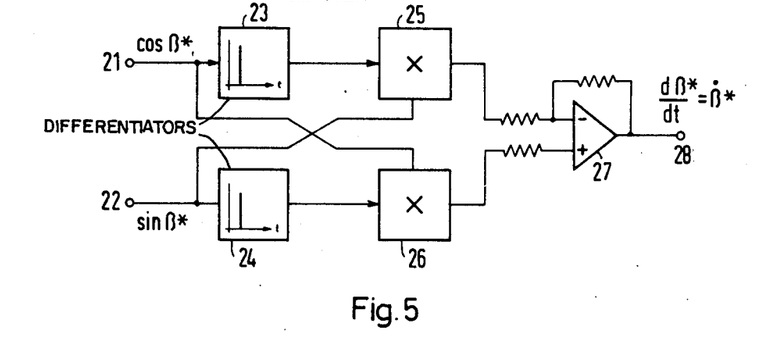
FIG. 5 is a block - circuit diagram of the velocity computing apparatus of FIG. 4.

FIG. 5 illustrates an embodiment of the velocity computing circuit 12 of FIG. 4. The inputs at terminals 21 and 22 are provided respectively to differentiators 23 and 24. The differentiated output of differentiator 23 is provided to a multiplier 25 which has as its second input sin B*. Similarly the output of differentiator 24 is provided to a multiplier 26 which has as its second input cos B*. The output of differentiator 24 will be −B* sine B* and that of differentiator 23 B* cosine B*. After multiplication in the multipliers 25 and 26 respectively the two outputs are subtracted in a summing amplified 25 to result in an output at terminal 28 of B* equal to $dB*/dt$. As described above this output is then compared in the comparator 23 with a preset value to operate the switch 14 controlling and switching between normal operation and a slow speed operation according to the present invention.

Figures 6, 7:
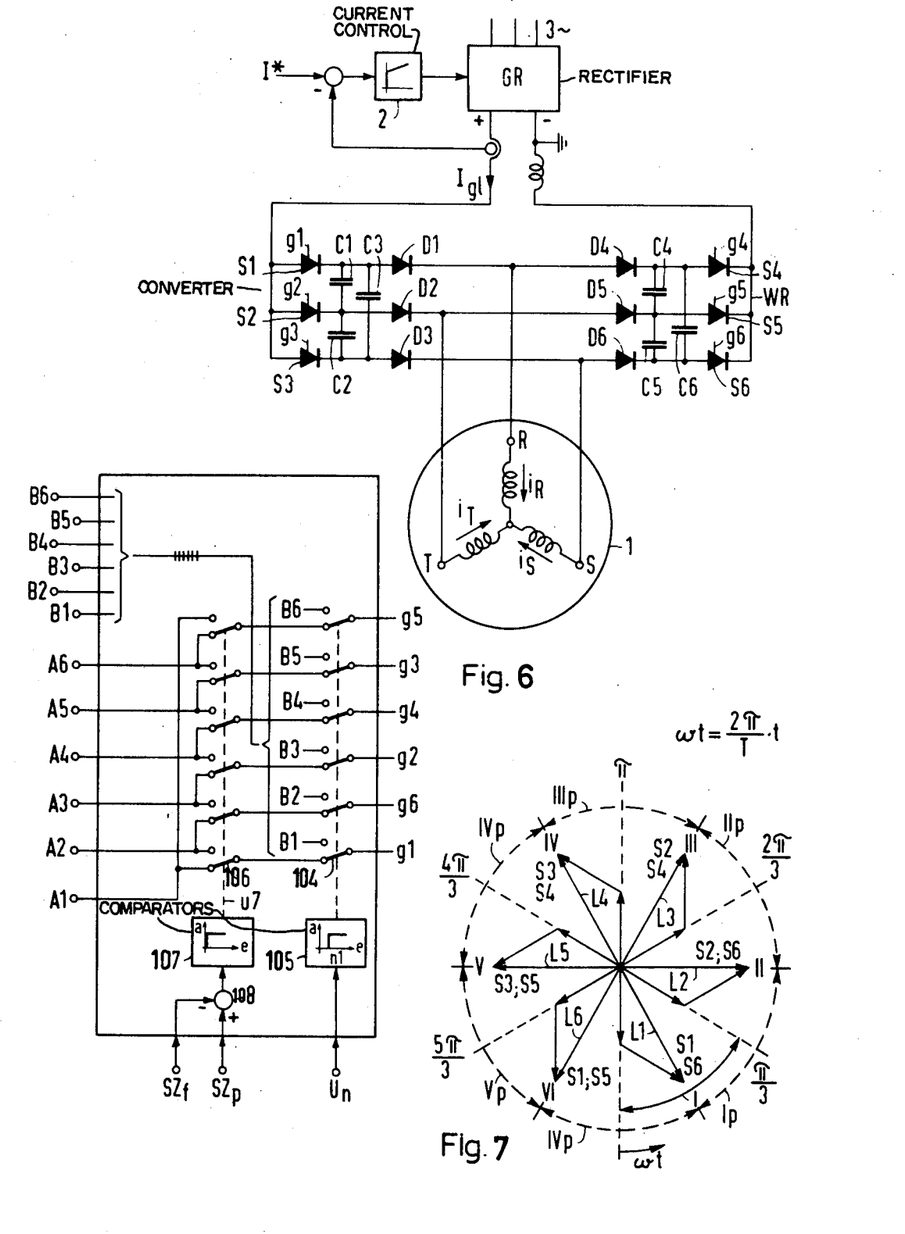
FIG. 6 is a schematic diagram of a converter driven rotating field machine utilizing the control system and the bridge circuit of the present invention.
FIG. 7 is the vector diagram similar to FIG. 2 helpful in understanding the operation of FIG. 6.

FIG. 6 is a diagram quite similar to FIG. 1. Shown is an asynchronous machine 1 having stator windings R, S and T and fed by an intermediate link converter. The intermediate converter includes a rectifier GR and a six pulse converter WR. A current controller 2 causes an impressed d-c current $I_{G1}$ to be forced in the intermediate link. This current is then fed through the controlled rectifiers S1 through S6 of the inverter WR to the stator windings R, S and T of the asynchronous machine 1. The controlled rectifiers will preferably be thyristors and hereinafter will be referred to as such although other similar type devices may be used. Each of the thyristors S1 through S6 in the inverter three phase bridge circuit has connected in series with a diode, the diodes being indicated as D1 through D6. Each of the thyristors S1 through S3 in one half of the three-phase bridge circuit has its cathode connected to a commutation capacitor, the commutation capacitors being indicated as C1 through C3.

In the other half ot the three-phase bridge circuit the anodes of the tyristors S4 through S6 are connected to each other through commutation capacitors C4 through C6. With this circuit arrangement, any two thyristors, where one thyristor is in one half of the bridge and the other in the other half of the bridge, can be fired at any time. As a result the commutation capacitors C1 through C6 are always charged with the necessary polarity so that, upon firing of a thyristor, the thyristor which was carrying current in the same half of the bridge will be quenched.

The control terminals g1 though g6 of thyristors S1 through S6 are acted upon either by a first group of control voltages A1 through A6 or by second group of control voltages B1 through B6. Which of the two groups of control voltages acts on the control terminals depends on the position of a multi-pole double throw switch 105. The double throw switch 4 is operated by a limit detector or comparator 105. Comparator 5 has as an input a voltage $u_N$ which is proportional to the frequency of the stator current vector for the asynchronous machine 1. If the stator current frequency is higher than the preset response theshold of the comparator 105 it actuates the double throw switch 105 and the control path g1 to g6 of the thyristors S1 to S6 are acted upon by the control voltages B1 to B6. In the position of the double throw switch shown on FIG. 1, where the control voltages A1 to A6 act on the control paths g1 to g6, the value of the voltage $u_N$ is below the respone threshold $N_1$. This is the case at correspondingly lower stator current frequencies. An additional double throw switch 106 is provided and actuated by a comparator 107. This comparator 107 and switch 106 periodically switch between two adjacent discrete positions of the stator current vector. This is the operation which occurs at low stator current frequencies. This operation, as will be explained in more detail below, is accomplished through an input at the comparator 107 which is the difference between the output signal $SZ_f$ of a sawtooth generator synchronized with the stator current frequency and an output signal $SZ_p$ of an additional sawtooth generator operating at the higer frequency.

The firing sequence of thtristors S1 through S6 and, as a result, the shape of the control voltages A1 through A6 and B1 to B6 respectively are illustrated by FIG. 7. Operation of the circuit will be explained with reference to this figure for one revolution of this stator current vector. The axis of the phase winding R is used as a reference axis, and the instantaneous angle of the stator current vector relative to this axis is designated as $\omega t = (2\pi/T).t$ where $\omega$ is the angular frequency and T the revolution time of the stator current. On FIG. 7 six possible discrete positions of the resultant stator current vector are designated by the vector arrows L1 to L6. These vectors are obtained by the firing of the thristors noted alongside the vector. For example, the vector L2 will result upon the firing of thyristors S2 and S5. In order that the stator current vector will move counter clockwise starting from $\omega t = 0$ in increments of 60°, the thyristors S1 and S6, for example, will first be fired. Thereafter the thyristors S2 and S6 will be conductive and then thyristors S2 and S4 and so on. Also designated are angular ranges I to VI. Within each of these ranges the thyristors indicated must be fired in the manner indicated. Where a continuously rotating presetting vector for the stator current vector is employed, it is always brought into the next discrete position in the clockwise direction as soon as the control vector passes the boundary of one of the zones. This type of operation takes place when the comparator 105 of FIG. 1 has responded, i.e. at higher stator current frequencies. It should be noted that this mode of operations is essentially the same as that in the prior embodiment described in connection with FIGS. 1–5 up to this point.

However, if the frequency of stator current falls below the response value $n_1$ of the comparator 105, a quasi-continuous control of the stator vector in pulsed operation takes place such that it is switched periodically, with a continuously changing keying ratio, between two adjacent discrete positions. With reference to FIG. 7, in addition to the regions designated by I – VI there are other regions designated by Ip – VIp. These regions are displaced in phase by $\pi/6$ or T/12 in time with respect to the regions I – VI. This is in order to avoid a phase jump in the stator current. In the pulsed mode of operation, the switching is between the vectors bounding these regions. For example, when the presetting vector enters the region designated, Ip thyristor S6 is kept continuously in the conducting state and the tyristors S1 and S2 are caused to fire alternately in rapid sequence. As will be seen more clearly below, if the presetting vectors is in the portion of the region Ip between $\pi/6$ and $\pi/3$ the stator current vector will occupy the position L1 for a longer time than position L2. If the angular position of the presetting vector is $\pi/3$ the dwelling times of the stator current vector in positions L1 and L2 are exactly equal. For the remainder of the region Ip, the control current vector occupies the position L2 for a longer time than the position L1. Since the ratio of dwelling times in the discrete positions L1 and L2 determines the effective intermediate position, the vector can be varied quasi-continuously between these positions as long as the ratio of dwelling times is properly varied. The same type of operation applies in the other regions IIp – VIp for pulsed operation. In such operation the double throw switch 106 of FIG. 6 is continuously and periodically switched by the comparator 107 in accordance with the difference between its input signals $SZ_f$ and $SZ_p$.

Figure 8:
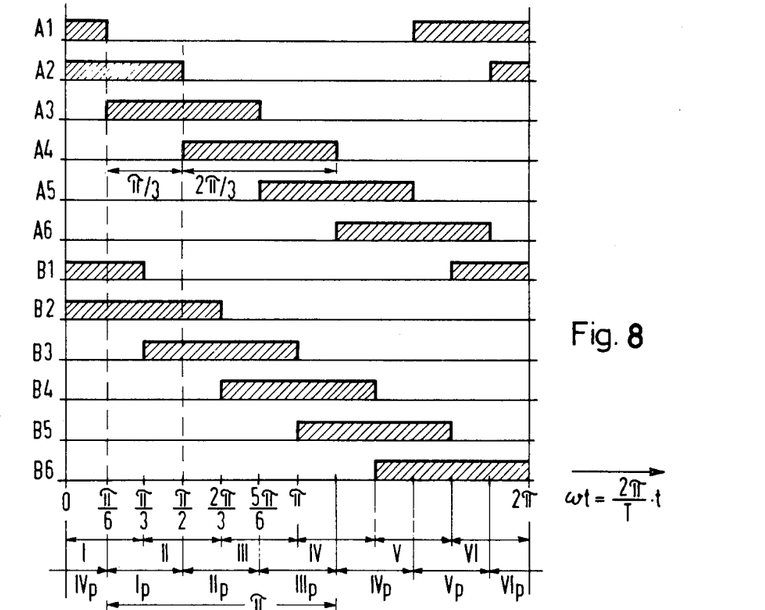
FIG. 8 is a pulse diagram illustrating the control voltages used for operation according to the present invention.

FIG. 8 is a pulse timing diagram of for the control voltages A1 – A6 and B1 – B6 used for the operating modes described above. These are signals which are fed through the double throw switches 106 and 104 of FIG. 6 to the control paths g1 to gb of the thyristors S1 to S6. One control voltage group, A1 to A6, and which is used for pulse operation at low frequency consists of six pulse voltages each of duration $2\pi/3$. These are displaced with respect to each other by $\pi/3$. The relationship holds for the second control voltages B1 – B6 except that these voltages are displaced with respect to the control voltages of the first group by $\pi/6$. FIG. 8 also illustrates the angular regions I – VI (unpulse operation) and Ip to VIp (pulsed operation) corresponding to the same angular regions shown on FIG. 7.

Using as an example the angular range Ip, the action on the individual control paths of the thyristor of the inverter WR of FIG. 6 will now be traced. In this angular region only the control voltages A2 and A3 of the control voltage group A1 to A6 have firing signals. Thus, in the position of the double throw switch 106 shown in FIG. 6 the thryistors S6 and S2 are triggered and in the other position of the double throw switch the thyristors S1 and S6 are triggered. Since the position of the double throw switch periodically changes, the thyristors S1 and S2 are fired in alternating fashion within angular range Ip while the thyristor S6 is maintained continuously in the conducting state.

If the stator current frequency becomes sufficiently high that the response threshold $n_1$ of the limit detector 105 is exceeded the double throw switch 104 is switched to its other position and the control path of the thyristor now is acted on in an unpulsed manner with the second control voltage group B1 – B6. In the angular region I only the control voltage B1 and B2 have firing voltages. Thus, thyristors S1 and S6 are fired as a comparison with FIG. 1 shows. In this angular region, the stator current vector thus always occupies the position designated L1.

Figure 9:
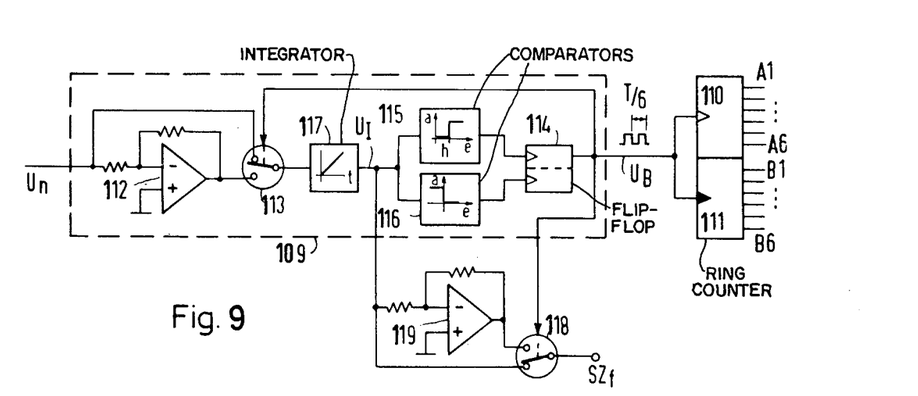
FIG. 9 is a circuit diagram illustrating apparatus for generating a signal proportional to control vector position and a first sawtooth signal.

FIG. 9 illustrates the simple manner of providing a control unit which can provide the two control voltage groups A1 – A6 and B1 – B6 along with generating the frequency synchronized sawtooth signal $SZ_f$. The control unit comprises essentially a voltage to frequency converter 109 having an output signal which is provided to two six stage ring counters 110 and 111. A d-c voltage $U_n$ proportional to a desired frequency for the current stator of the rotating field machine 1 is provided as an input to the voltage frequency converter 109. The voltage to frequency converter 109 includes an amplifier 112 for inverting the signal $U_n$. The signal $U_n$ and the inverted signal are provided to a switch 113. Although indicated as a mechanical switch, this switch will preferably be a semiconductor switch such a FET switch. The output of switch 113 is the input to an intergrator 117. The intergrator output is provided as inputs to first and second comparators 15 and 16. Comparator 15 has as a refernce value a predetermined value $h$ and comparator 116 the reference value 0. Thus, each time the intergrated voltage $U_l$ from intergrator 117 reaches the value $h$, an output pulse from comparator 115 will be provided. This output pulse is used to set a flip-flop 114, the output of which is fed back to the switch 113. Similarly, when an output is received from the comparator 116, the flip-flop 14 is reset to again switch the switch 113. The result is that the intergrator 117 intergrates up till it reaches the level $h$ whereupon it intergrates down to 0 and then back up again. The output $U_l$ is shown on FIG. 11 and will described in more detail below. The output from flip-flop 114 will be a waveform with a period T/6. In other words, the frequency of this waveform will be proportional to the input voltage and also proportional to the desired stator current frequency. As a result, the outputs of the flip-flop 114 can simply be provided to the ring counter 110 and 111 to develop the signal groups A1 – A6 and be B1 – B6. The ring counter 110 is arranged to increment on the leading edge and the ring counter 111 on the trailing edge of the pulses from flip-flop 114 so that there will be an offset of T/12 between the two groups of signals. The outputs of FIG. 8 can easily be obtained from these ring counters using well known decoding techniques.

Figure 11:
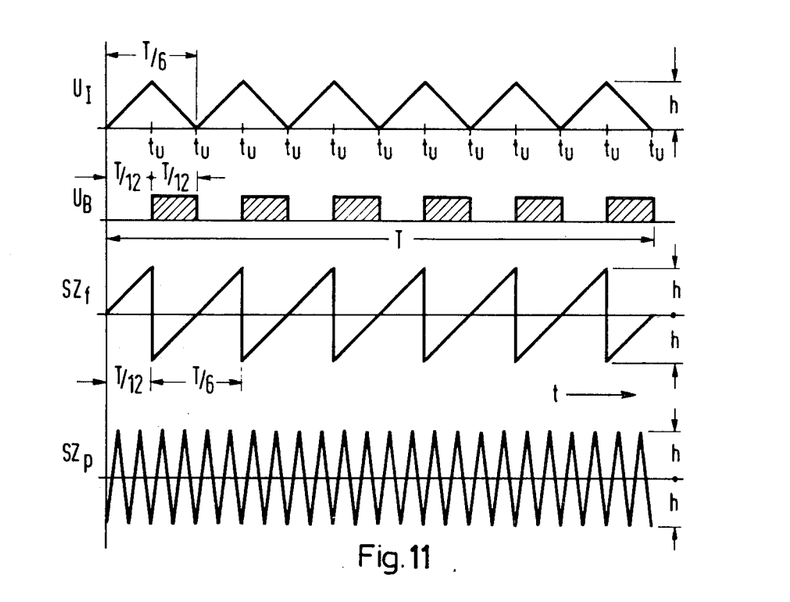
FIG. 11 is a waveform diagram illustrating the time relationship between the various waveforms associated with FIGS. 9 and 10.

The signal $U_l$ is also fed to an inverting amplifier 119 the output of which is coupled to a switch 118. Switch 118 has another input directly from the output $U_l$. Like the switch 113 it is controlled by the output of flip-flop 114. The result of carrying out this inversion is shown by FIG. 11. Shown thereon is the sawtooth $SZ_f$ which is developed as a result of this circuit.

Figure 10:
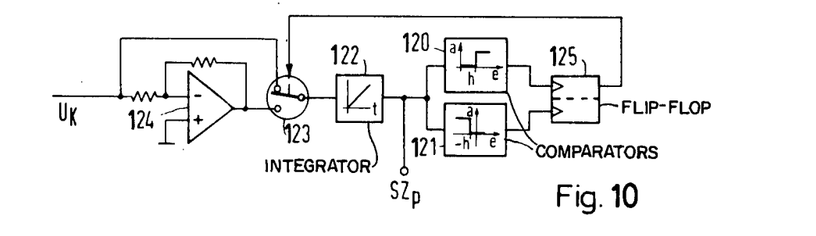
FIG. 10 is a circuit diagram of a circuit for generating a second sawtooth signal.
Figure 12:
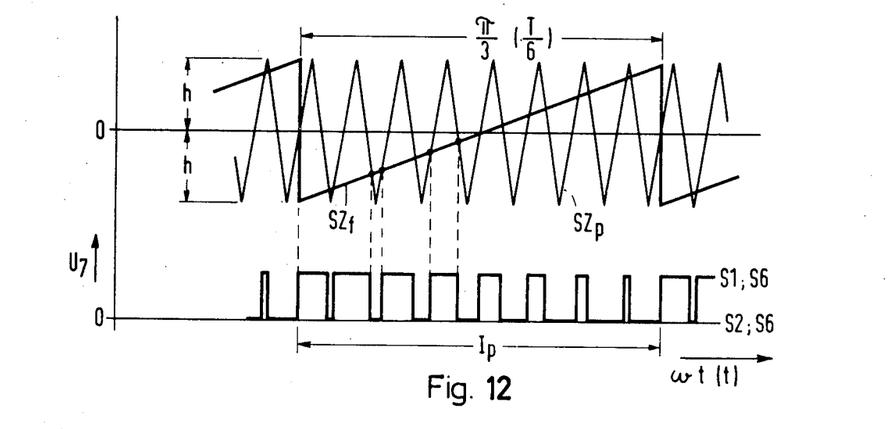
FIG. 12 is further waveform diagram illustrating the summing of the two sawtooth waveforms in the mixer of FIG. 1.

FIG. 10 illustrates a sawtooth generator, more correctly a triangular wave generator, for generating the sawtooth voltage $SZ_p$. This construction is quite similar to that of the voltage to frequency inverter described above in connection with FIG. 9. In this circuit, a fixed voltage $U_K$ matched to the intergration time of an intergrator 122 such that the signal $SZ_p$ will have a substantially higher repetition frequency than the frequency synchronized sawtooth generator signal $SZ_f$ is provided. The input voltage $U_k$ is once again fed through an inverter 124 and directly to a switch 123 which is switched by the output of a flip-flop 125. The switch output is coupled to the intergrator 122 which provides its output once again to a pair of comparators 120 and 121 the outputs of which are used to set and reset flip-flop 125. In this case, the comparators have their limits set at $+h$ and $-h$, respectively, so that the intergrator operates linearly between these two limits as shown on FIG. 11. In addition, since a further inversion is not carried out the resulting wave is a triangular wave. As noted above, the difference between the frequency synchronized sawtooth generator signal $SZ_f$ in the sawtooth $SZ_p$ of a higher frequency is formed in an adder or mixer 108 of FIG. 6, i.e. the adder or mixer 108 may simply be an operational amplifier used for summing the two signals or more correctly for subtracting them. The output of the mixer 108 is used to operate a comparator 107 which in turn operates the double throw switch 106 for pulsed operation at slow speeds. This operation can now be better understood with reference to FIG. 12 which illustrates the subtraction of the two sawtooth signals and the pulses generated at the output of the comparator 107. Comparator 7 is arranged so that whenever the signal $SZ_p$ is greater than the signal $SZ_f$ it will provide a signal switching the double throw switch 106 from the position shown in FIG. 6 to its other position. At times when the signal $SZ_f$ is smaller than the signal $SZ_p$ the comparator 107 provides no output and the double throw switch 106 occupies its normal position shown in FIG. 6. For example, in this position the thyristors S2 and S6 would be fired in the angular region Ip and in the other position the valves S1 and S6 fired. With a constant stator current frequency this would mean that the stator current would oscillate continuously between the positions L1 and L2 with its dwelling time in the position L1 becoming continuously smaller and the dwelling time in the position L2 becoming continuously longer linearly with time. In other words, the effective vector position will gradually and continuously effectively move through the angular region Ip.

Figure 13:
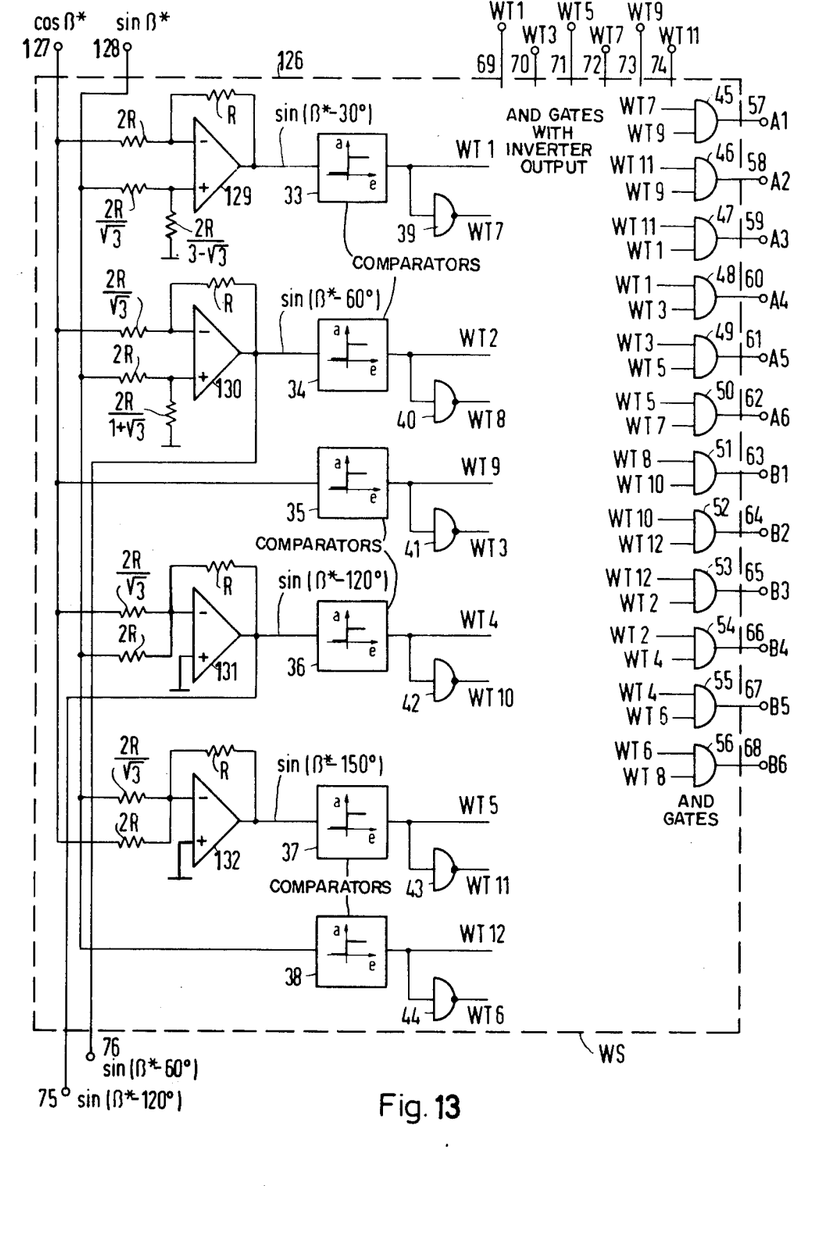
FIG. 13 is a schematic diagram of an alternate embodiment for generating control signals.
Figure 14:
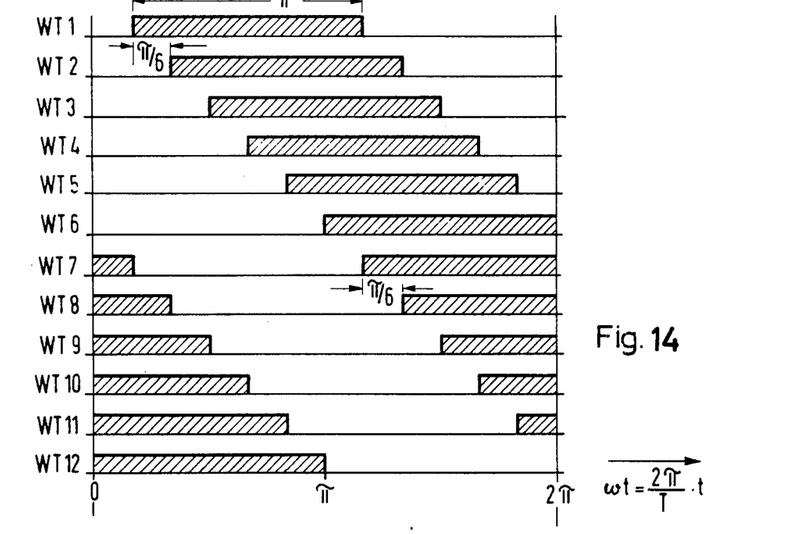
FIG. 14 is a pulse diagram illustrating the outputs of the apparatus of the FIG. 13.

FIG. 13 illustrates an alternate manner of forming control voltages A1 – A6 and B1 – B6. In the arrangement of FIG. 13 control voltages are generated using an angle switch 26 having as inputs at terminals 127 and 128 component voltages $\sin\beta^*$ and $\cos\beta^*$ representing a continuously rotating presetting vector. $d\beta^*/dt$ corresponds to the angular frequency $\omega$ of the stator current. $\cos\beta Z$ is proportional to the component of presetting vector which points in the direction of the winding axis R of the rotating field machine 1 and $\sin\beta^*$ is proportional to the component of the presetting vector perpendicular thereto. The circuit of FIG. 13 is a modification of angle switch described in U.S. Pat. No. 3,824,437. The inputs of four operational amplifiers 129, 130, 131 and 132 are connected to the input terminals 127 and 128 through suitably chosen resistors such that a voltage is produced at the output of amplifier 129 which lags the component voltage $\sin\beta^*$ at terminal 128 by 30°. Similarly, the output of amplifier 130 provides a voltage lagging the voltage $\sin\beta^*$ by 60° and the output of amplifier 131 lags the volage $\sin\beta^*$ by 120°. Finally, the output of amplifier 132 is the voltage lagging the voltage $\sin\beta^*$ by 150°. The respective outputs of amplifiers 129-132 are provided to comparators 33, 34, 36 and 37. The voltage $\sin\beta^*$ is provided to a comparator 35 and the voltage $\cos\beta^*$ to a comparator 38, connected to each comparator output is an inverter in form of a gate. Thus, there are shown coupled to the respective comparators 33—38 inverter gates 39–44. This arrangement results in the development of the pulse trains WT1 – WT12 illustrated on FIG. 14. The pulse trains are displaced with respect to each other by $\pi/6$ and have a duration corresponding to one half a revolution of the presetting vector. In the angle switch 126 are also provided twelve AND gates 45–56. There are coupled to the corresponding outputs of the comparators 33–38 and inverter gates 39–44 in the manner indicated to develop the necessary two groups of control voltages A1 – A6 and B1 – B6 at output terminal 57–68.

Figure 15:
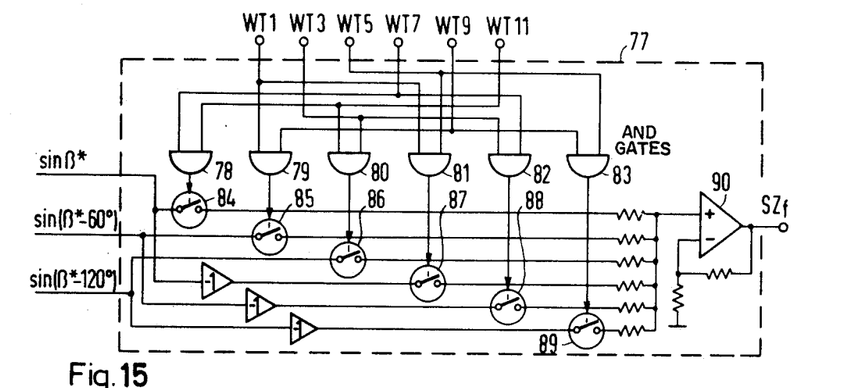
FIG. 15 is a circuit diagram illustrating a manner of obtaining a sawtooth waveform using the outputs from the circuit of FIG. 13.

FIG. 15 illustrates an additional embodiment for forming the frequency synchronized sawtooth signal $SZ_f$. This embodiment which is used to conjunction with the angle switch of FIG. 13 utilizes the signals WT1, WT3, WT5, WT7, WT9 and WT11 along with the output signals of the amplifiers 130 and 131. As illustrated these two amplifiers outputs are brought out to terminals 75 and 76 respectively for this purpose. The former signals are brought at terminals 69–74. Also used is the signals $\sin\beta^*$. The voltages WT1, WT3, WT5, WT7, WT9 and WT11 are interlinked in a plurality of six AND gates 78–83 such that their outputs sequentially furnished, during a time of T/6, actuating signals for six switches 84–89 which are used for coupling through one of the six sine voltages, which are mutually phase shifted by 60°, to the input of an amplifier 90. Note, that in addition to the three sign signals brought in, three more sine signals are developed through inverters.

Figure 16:
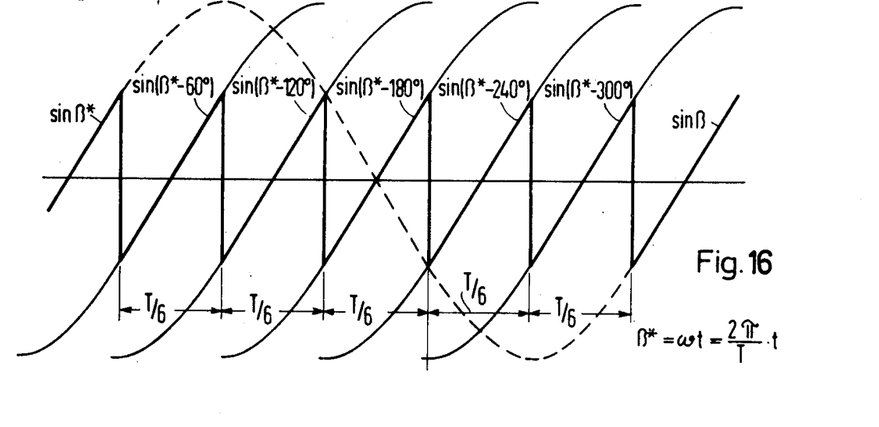
FIG. 16 is a waveform diagram helpful in understanding the operation of FIG. 15.

The result of this operation is illustrated by FIG. 16. The partial sections of the sine voltages which are coupled through to the amplifiers 90 are illustrated thereon. Each section extends between plus and minus 30° of the respective sine voltage. In this region the shape of a sine function is approximately linear so that in principle the same frequency synchronized sawtooth voltage waveshape as illustrated above on FIG. 11 is obtained.

Figure 17:
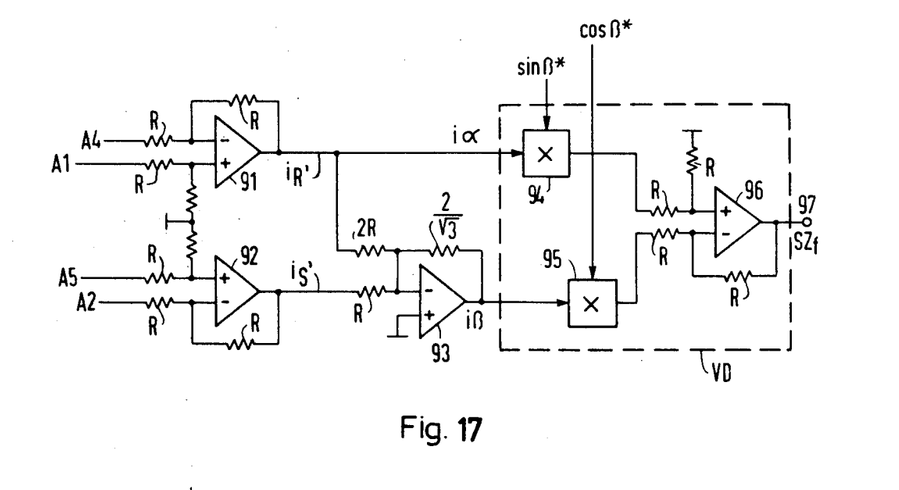
FIG. 17 is a further embodiment for generating a sawtooth proportional to the control vector rotation.

A third manner of obtaining a frequency synchronized sawtooth generator is illustrated on FIG. 17. In the arrangement shown thereon two phase currents $i_R'$ and $i_S'$ of a stator current vector which in its rotation assumes six discrete positions are simulated from four control voltages of the control voltage groups used in pulsed operation. However, the discrete positions are advanced electrically 30° relative to the positions designated by L1 – L6 in FIG. 7. Two orthogonal components of this simulated stator current vector are then formed from these phase currents observing the symmetry condition $i_R' + i_S' + i_T' = 0$. The sine of the angle between position of this vector and the angular position of the continuously presetting factor is formed. The sine of the difference angle will always be at its maximum negative value when the preset vector enters one of the regions $I_p$ to $VI_p$ will have a value 0 in the center of this region and will have maximum position will at the point where the presetting vector leaves the region. Over one revolution of the presetting vector the waveform shown on FIG. 16 is thus obtained.

As illustrated by FIG. 17 phase currents $i_R'$ and $i_S'$ are formed using two amplifiers 91 and 92 having as inputs the control voltages A1 and A4 and A5 and A2 respectively. In a further amplifier 93 the component $i_\beta$ of the simulated stator current vector is formed, this falling in the direction designated L2 of FIG. 7 with the other component $i_\alpha$ orthogonal thereto assumed to fall in the direction of the winding axis R of the rotating field machine 1. A vector rotator VD comprising two multipliers 94 and 95 and an amplifier 96 forms, from the two orthogonal components $i_\alpha$ and $i_\beta$ of the simulated stator current vector and the two orthogonal components of the control voltage vector $\sin\beta$: and $\cos\beta^*$, a quantity corresponding to the sine of the angular difference between the respective angular positons of these vectors. This difference is provided as a sawtooth generator signal $SZ_f$ at the terminal 97. This voltage waveform will be of the type illustrated by FIG. 16.

Thus a method and apparatus for operating an inverter controlled rotating field machine at slow speed has been shown. Also specific embodiments have been illustrated and described, it will be obvious to those skilled in the art that various modifications may be made without departing from the spirit of the invention which is intended to be limited solely by the appended claims.

We claim:
1. A method for controlling the impressed position of the stator current vector in a convertor driven rotating field machine, which can be energized only to provide a predefined pluraltiy of discrete vector positions, such as to avoid uneven running at low rotation speeds comprising:
   a. defining a desired impressed position of the stator current vector; and
   b. alternately energizing the two discrete vector positions on each side of said desired position for relative time periods which will result in an average vector position corresponding to said desired position.

2. The method according to claim 2 where said alternate energization is done by rotating the current vector with a constant direction of rotation.

3. The method according to claim 1 wherein said alternate energization is accomplished by generating a first sawtooth wave which is synchronized with the frequency of the stator current vector and a second sawtooth wave having a frequency substantially higher, finding the difference between said sawtooth waves and switching between two discrete vector positions as a function of said difference.

4. A method for controlling the impressed position of the stator current vector in a convertor driven rotating field machine, which can be energized only to provide a predefined pluraltiy of discrete vector positions, such as to avoid uneven running at low rotation speeds comprising;
   a. rotating the current vector with a constant direction of rotation;
   b. defining a sector which is bisected by the desired vector position;
   c. generating a control vector which cintinuously rotates at a constant direction and to which the converter of the machine is responsive;
   d. computing the angular difference between the desired bector position and the control bector; and
   e. causing said control vector to rotate at a first slow speed when within said sector and at a second fast speed, which is approximately the maximum angular velocity at which commutation is possible when outside said sector, whereby the two discrete vector positions on each side of a desired position will be alternately energized for relatibe time periods to result in an average vector position corresponding the the desired position.

5. The method according to claim 4 wherein said vector subtends an angle equal to the angular difference between discrete vector positions.

6. In a converter controlled rotating field machine wherein the machine control system includes means to generate, in response to signals representing the sine and cosine of a desired vector position, the sine and cosine of a control vector position and including means to compute the angular difference between said control and desired vector positions and the sine and cosine of said difference, said control vector sine and cosine being generated by means having as an input the angular difference, and wherein, in response to the sine and cosine of the control vector the converter sequentially causes the stator current vector to rotate through a predetermined plurality of discrete positions, apparatus to improve the slow speed operation of the machine comprising:
   a. means to sense when the desired speed of rotation falls below a predetermined minimum at which smooth operation ceases and to provide an output indicative thereof;
   b. comparing means having as inputs one of the angular difference between the desired vector position and control vector position a function responsive to provide an output at a first level if the absolute value of said difference is within a predetermined limit and at a second level if said limit is exceeded; and
   c. means responsive to the output of said sensing means to remove from the input of the means generating the sine and cosine of the control vector the angular difference and to provide, instead, to said input the output of said comparing means.

7. The invention according to claim 6 wherein the sine and cosine of the angular difference are computed in a vector rotator.

8. The invention according to claim 7 wherein said sensing means comprise means to compute the angular velocity of the desired vector position and a comparator having the output of said computing means as an input and providing an output when the computed velocity drops below a predetermined level and said means responsive to the output thereof comprises a switch having as inputs the angular difference and the output of said comparing means and having an output coupled to the means generating the sine and cosine of the control vector, said switch providing one of its inputs as an output in response to said sensing means.

9. Apparatus for controling the position of the stator current vector of a rotating field machine supplied with impressed current through an inverter with controlled rectifiers during slow speed operation by alternately energizing two adjacent vector positions comprising:
   a. means to generate voltage pulses for the controlled rectifier of the inverter;
   b. switching means coupling said means to generate to the individual controlled rectifiers of said inverter;
   c. a first sawtooth generator synchronized with the stator frequency developing a first output signal;
   e. a second sawtooth generator providing a second output signal at a higher frequency;

f. means to determine the differnece between said first and second sawtooth output signals, to develop a third output signal;

g. means responsive to said third output signal for switching said said switching means to thereby change the position of the stator current vector whereby said stator current vector will brought into one and the other adjacent discrete positions in an alternating manner to thereby provide an effective vector therebetween and whereby a quasi-continuous control of said vector between discrete positions will take place.

10. Apparatus according to claim 9 wherein said inverter has n controlled rectifiers and wherein said means for generating control voltages includes means for generating a first group of control voltages for the individual rectifiers and a second group of control voltages for the individual rectifiers with the control voltages for each rectifier in the first group leading the corresponding control voltage of the second group by $\pi/n$ electrical degrees and further including means having as an input a signal proportional to speed and providing a fourth output responsive to said input signal exceeding a predetermined level; and switching means coupled to said means and responsive thereto to switch the inputs to said individual rectifiers between said first and second groups.

11. Apparatus according to claim 10 wherein the said inverter comprises a three phase bridge consisting of six thyristors with a diode connected in series with each thyristor and wherein the thyristor cathodes of the thyristors in one half of the bridge are connected together through a first group of capacitors and wherein the anods of the other half of the bridge are connected together through a second group of capacitors.

12. Apparatus according to claim 11 wherein said means generating control voltages comprises a voltage to frequency converter having as an input a voltage proportional to desired frequency, and first and second n stage ring counters having as inputs the output of said voltage to frequency converter.

13. Apparatus according to claim 12 wherein said voltage to frequency converter includes an intergrator and further including means to periodically reverse the polarity of said input voltage and provide it to said intergrator.

14. Apparatus according to claim 11 and further including means to generate sine and cosine components of a presetting vector and wherein said means for generating control voltages is an angle switch comprising:

a. first, second, third and fourth operational amplifiers coupled to said means generating said sine and cosine voltage to develop respective sine components displaced 30°, 60°, 120° and 150° respectively from said sine component;

b. six comparators having as inputs the respective outputs of said amplifiers and said sine and cosine components;

c. six inverters coupled to the outputs of said six comparators; and d. tweleve AND gates each having two inputs selected from said six comparator outputs and said six converter outputs said inputs selected so as to develop control voltages which are mutually displaced by $\pi/6$.

15. Apparatus according to claim 14 wherein said means to generate a frequency snychronized sawtooth wave comprises six switches having as switching inputs the outputs of six of said AND gates said switches coupling six sinusoidal voltages obtained from said angle switch and which are displaced by $\pi/3$ with respect to each other and means for combining the outputs of said six switches into a sawtooth wave.

16. Apparatus according to claim 14 wherein said sawtooth generator comprises a component forming circuit for the simulating orthogonal components of a fictitious stator current vector having as inputs four control voltages, and a vector rotator having as inputs the outputs of said component circuit and the components of said presetting vector and developing at its output said sawtooth wave.

* * * * *